US006517441B1

(12) United States Patent
Huang

(10) Patent No.: US 6,517,441 B1
(45) Date of Patent: Feb. 11, 2003

(54) ROTARY ASSEMBLY FOR A GAME MACHINE

(76) Inventor: Jih-Shang Huang, 11F-2, No. 43, Chai-I Street, Taichung City (TW)

( * ) Notice: Subject to any disclaimer, the term of this patent is extended or adjusted under 35 U.S.C. 154(b) by 0 days.

(21) Appl. No.: 09/943,457

(22) Filed: Aug. 31, 2001

(51) Int. Cl.[7] .................................................. F16D 3/78
(52) U.S. Cl. .......................................... 464/185; 464/95
(58) Field of Search .............................. 464/29, 88, 91, 464/94, 95, 96, 185, 900; 40/502, 503, 504, 505, 506, 473

(56) References Cited

U.S. PATENT DOCUMENTS 2,727,324 A * 12/1955 Harris ......................... 40/432
2,976,630 A * 3/1961 Montfort ...................... 40/503
3,153,292 A * 10/1964 Glasgow ...................... 40/479
3,660,917 A * 5/1972 Bevan ....................... 192/3.51
5,063,377 A * 11/1991 Smith ........................ 192/3.51

* cited by examiner

*Primary Examiner*—Lynne H. Browne
*Assistant Examiner*—Kenn Thompson
(74) *Attorney, Agent, or Firm*—Charles E. Baxley

(57) ABSTRACT

A rotary assembly for a game machine includes a disk connected to a casing and the disk has passages defined therethrough. Three driving members are piled up and received in the casing and bearings are located between the driving members. Three first conductive members are respectively located between the driving members and each first conductive member has a conductive protrusion which movably extends through a slot defined through the casing. Three second conductive members are located between the driving members and engaged with the driving members. The second conductive members each have through holes which are located in alignment with the passages in the disk. Wires connected to the first conductive members extend through the through holes and the passages. The wires fare not tangled when the disk is rotated.

2 Claims, 4 Drawing Sheets

ROTARY ASSEMBLY FOR A GAME MACHINE

FIELD OF THE INVENTION

The present invention relates to a rotary assembly for a game machine wherein the outside signals enter in the assembly are able to be sent to the top of the bottom of the assembly without tangling the wires.

BACKGROUND OF THE INVENTION

A conventional ball game machine includes a rotary assembly which is driven by a motor and a bead disk is located above the motor. A plurality of beads are embedded in the bead disk and each bead is connected to a wire. The beads are exposed above the surface of the bead disk and biased by a spring. A coil disk is located above the bead disk and the beads contact one of plural coils on the coil disk. The beads are moved across the coils so that the frequent frictional movement generates debris which affect the signals so that the game machines have to be proceeded of maintenance frequently. Besides, the installation or assembling of the beads, the springs and the wires take too much time.

SUMMARY OF THE INVENTION

In accordance with one aspect of the present invention, there is provided a rotary assembly of a game machine and the assembly comprises a disk having a plurality of passages and a casing connected to the disk. A plurality of position holes and a central hole are respectively defined through the disk. An engaging recess is defined in a bottom of the disk and communicates with the central hole.

A plurality of driving members each have a driving portion extending from a surface thereof and a recess is defined in the other surface of the driving members. The driving members are piled up by engaging the driving portion of one of the driving members with the recess of the following driving member. Each driving member has guide holes which are located in alignment with the passages in the disk. Each driving member has a bearing mounted thereto and a first conductive member contacts a bottom of each of the bearings. An isolation member is located between the first conductive member and the bearing of the following driving member. Each driving portion has a second conductive member mounted thereto and a plate extends from each of the second conductive member. The plates of the second conductive members are engaged with one of the guide holes in each of the driving members.

The casing assembly encloses the driving members, the first conductive members, the second conductive members, the bearings and the isolation members. The casing assembly has slots defined therethrough and the first conductive members each have a conductive protrusion which is movable extending through the slits.

The primary object of the present invention is to provide a rotary assembly for a game machine wherein wires extend through holes in the rotatable driving members in the assembly so that the wires will not be tangled with each other when the driving members are rotated.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
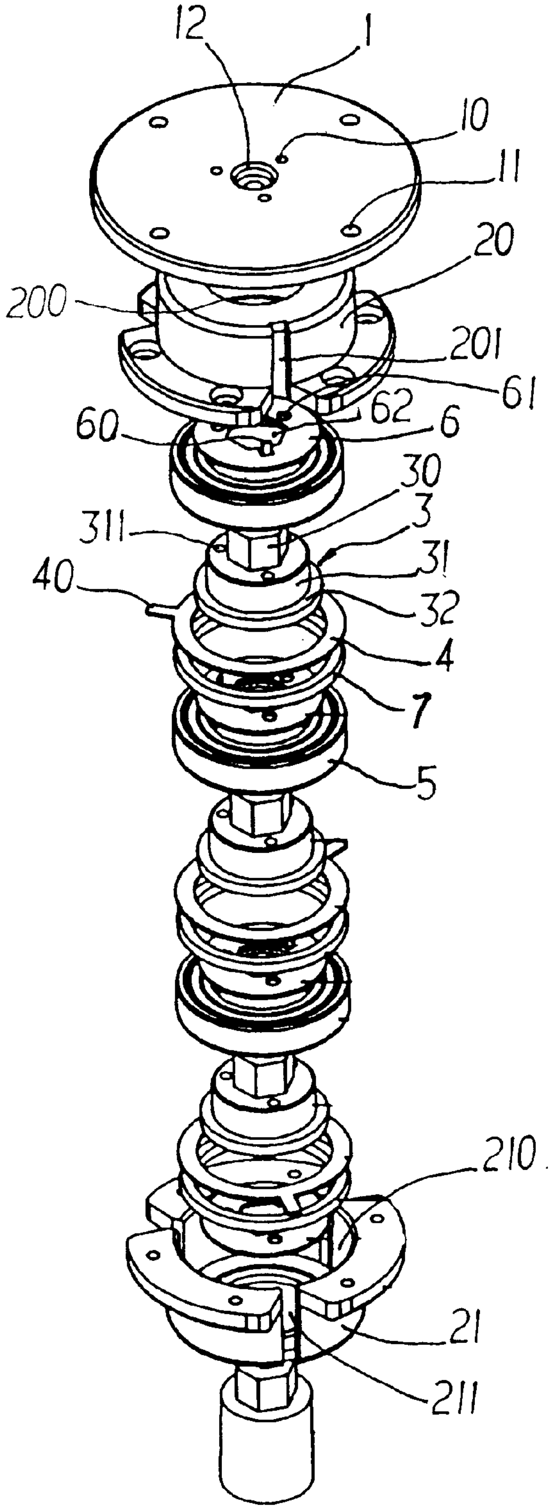
FIG. 1 is an exploded view to show the rotary assembly of the present invention.
Figure 2:
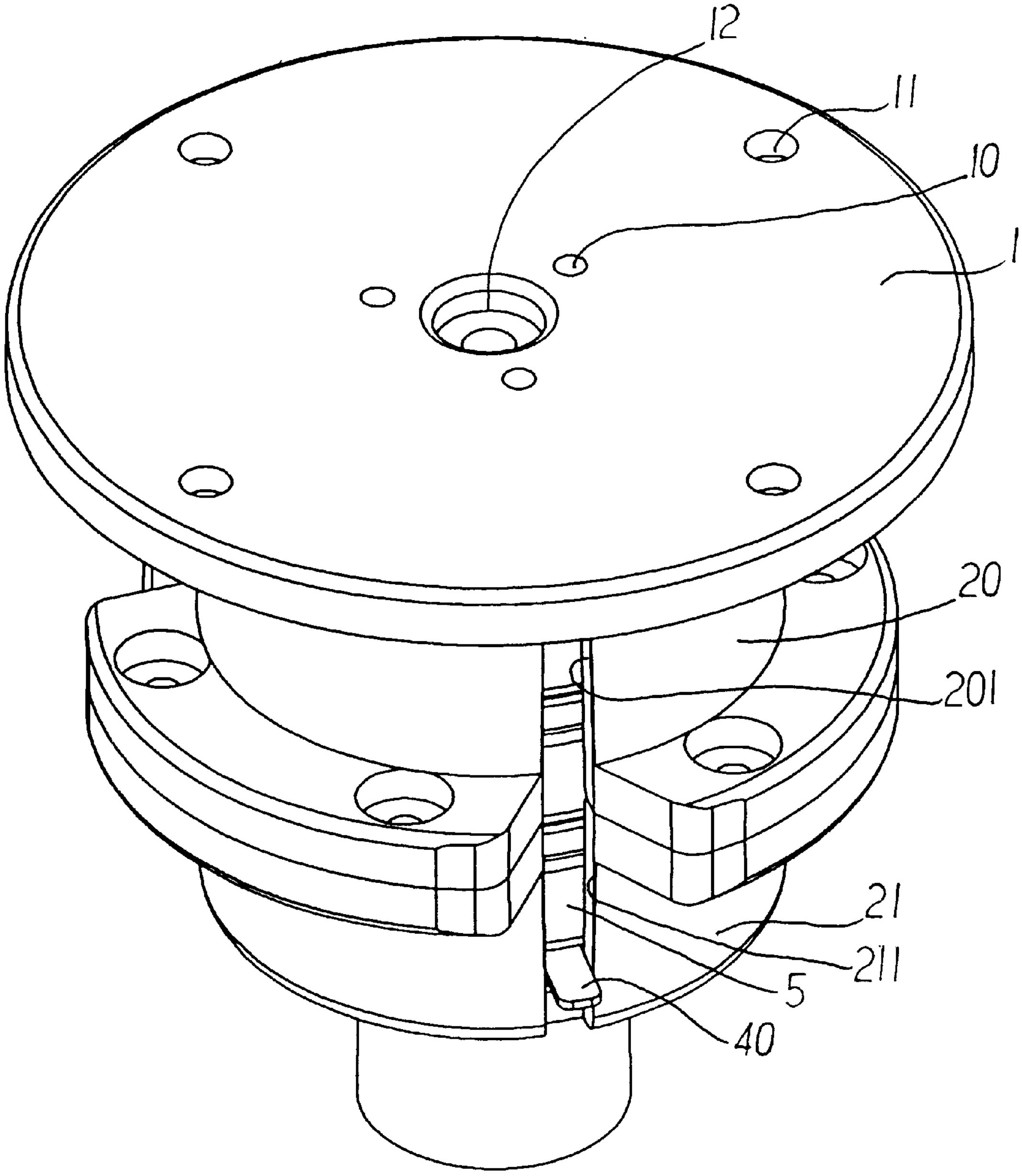
FIG. 2 is a perspective view to show the rotary assembly of the present invention.
Figure 3:
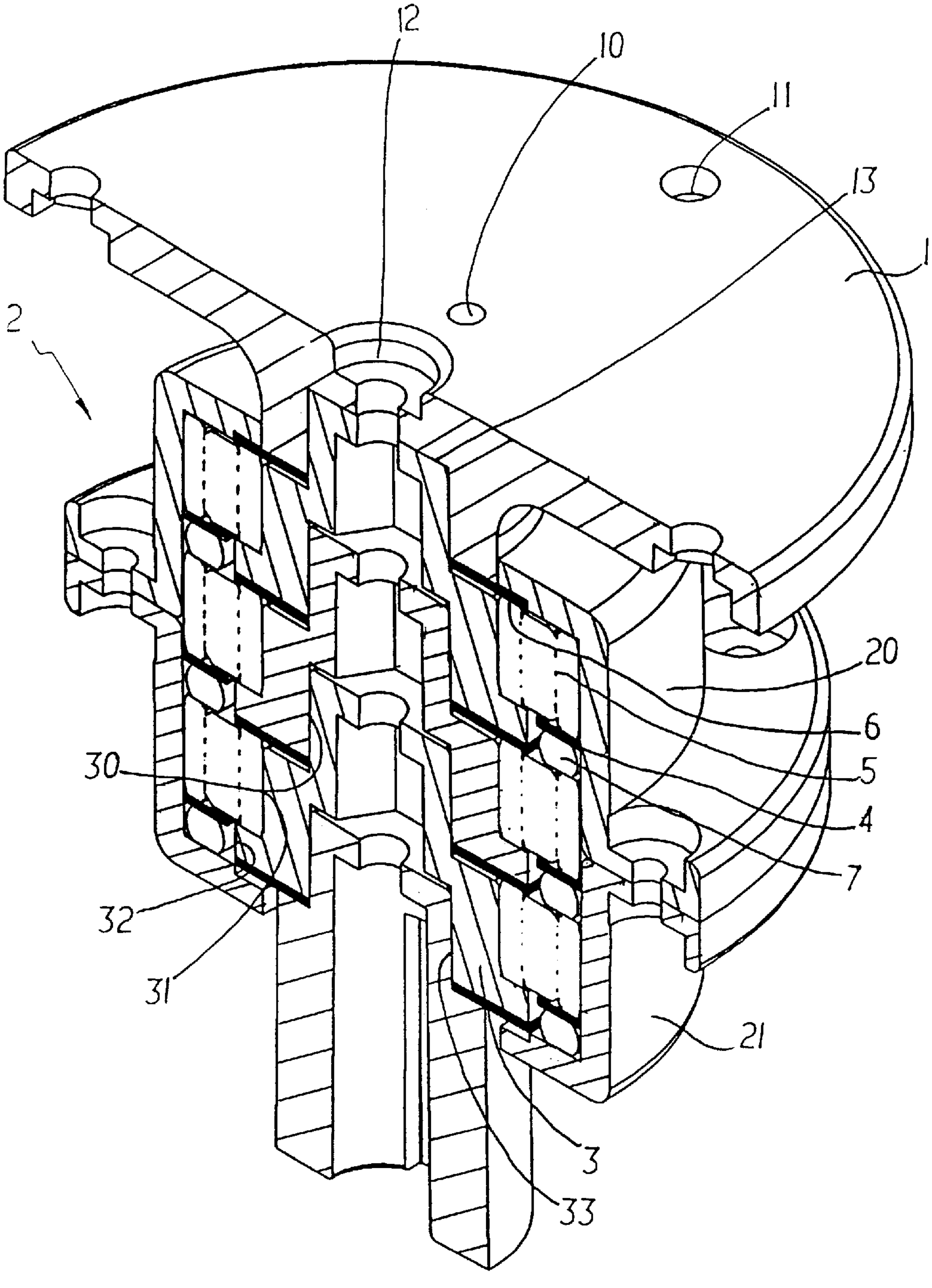
FIG. 3 is a cross sectional view to show the rotary assembly of the present invention.
Figure 4:
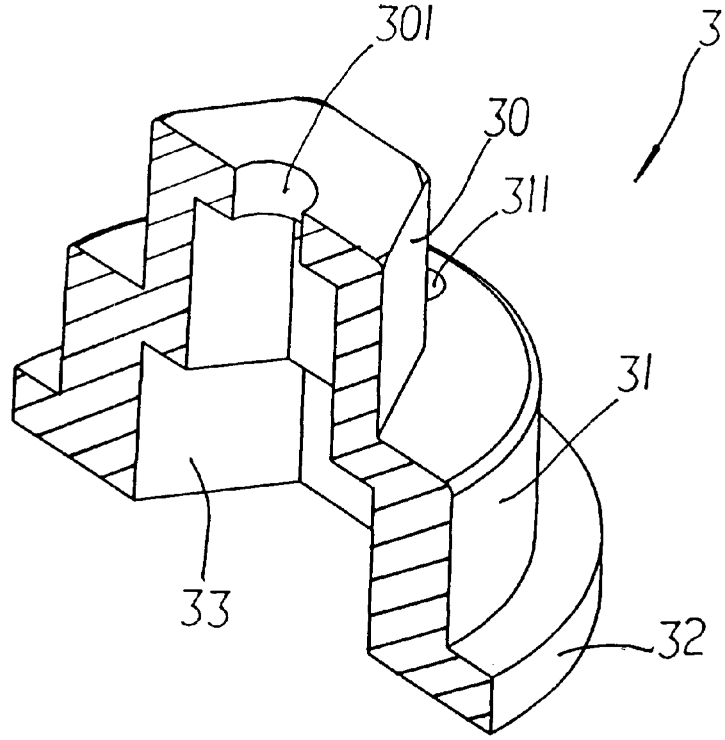
FIG. 4 is a cross sectional view to show the driving member in the rotary assembly of the present invention.
Figure 5:
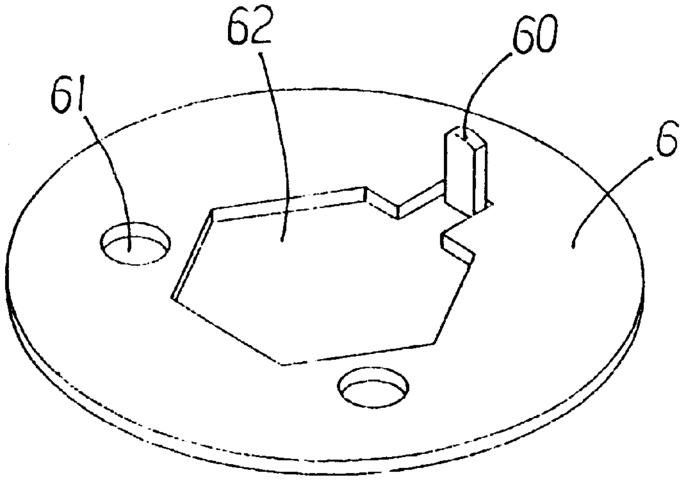
FIG. 5 is a perspective view to show the second conductive member in the rotary assembly of the present invention.

Referring to FIGS. 1 to 5, the rotary assembly of the present invention comprises a disk 1 and a casing assembly 2, wherein the disk 1 has a plurality of passages 10, position holes 11 and a central hole 12 respectively defined therethrough. An engaging recess 13 is defined in a bottom thereof and communicates with the central hole 12. The engaging recess 13 is a polygonal recess for being engaged with a driving portion 30 of a driving member 3. The disk 1 is fixed to a motor (not shown) by extending a bolt (not shown) through the central hole 12 and engaged with the motor.

The casing assembly 2 includes an upper casing 20 and a lower casing 21. Each of the upper casing 20 and the lower casing 21 has a receiving space 200/210 so as to receive driving members 3, first conductive members 4, bearings 5, second conductive members 6 and isolation members 7. A slot 201/211 is defined through the upper casing 20 and the lower casing 21 so that a conductive protrusion 40 of each of the first conductive members 4 extend from the slot 201/211.

A hole 301 is defined through the driving portion 30 of each of the driving members 3 and a position portion 31 is connected to the driving portion 30, and a flange 32 extends radially outward from the position portion 31. A polygonal recess 33 is defined in the driving member 3 and communicates with the hole 301. The number of the driving members 3 are three in this embodiment and the three driving members 3 are overlapped with each other by engaging the driving portion 30 of a lower driving member 3 with the polygonal recess 33 of the top driving member 3. The driving member 3 on the top of the pile of the driving members 3 is engaged with the engaging recess 13 of the disk 1. Each of the driving portions 30 is mounted by a polygonal hole 62 of the second conductive member 6. A plate 60 extends from a surface of each of the second conductive members 6 and extends through one of three guide holes 311 defined through the position portion 31 of the driving member 3. Each plate 60 has two through holes 61 which are located in alignment with the two of the three guide holes 311 so that wires extend through the through holes 61 and the guide holes 311 and the passages 10 in the disk 1. The bearing 5 is mounted to the position portion 31 and rested on the flange 32. The first conductive member 4 and the isolation member 7 are mounted to the flange 32 and clamped between the two bearings 5. The driving members 3 are made by non-conductive material.

When a signal is sent from outside of the assembly and transferred to top and bottom of the assembly, the signal is sent to the conductive protrusion 40 of each of the first conductive members 4. The first conductive members 4 contact the bearings 5 which contact the second conductive members 6. Wires (not shown) extend through the guide holes 311, through holes 10 and the passages 10. The signals are then sent through the inside of the assembly. When the driving members 3 are rotated by the motor, the first conductive members 4 and the casing assembly 2 will not rotate because of the bearings 5. Therefore, the wires are not tangled when the driving members 3 rotate so that the signals can be sent without interruption.

While we have shown and described the embodiment in accordance with the present invention, it should be clear to those skilled in the art that further embodiments may be made without departing from the scope of the present invention.

What is claimed is:

1. A rotary assembly of a game machine, comprising:

a disk having a plurality of passages, position holes and a central hole respectively defined therethrough, an engaging recess defined in a bottom of the disk and communicating with the central hole;

a plurality of driving members each having a driving portion extending from a surface thereof and a recess defined in the other surface of the driving members, the driving members being piled up by engaging the driving portion of one of the driving members with the recess of the following driving member, each driving member having guide holes which are located in alignment with the passages in the disk, each driving member having a bearing mounted thereto and a first conductive member contacting a bottom of each of the bearings, an isolation member located between the first conductive member and the bearing of the following driving member, each driving portion having a second conductive member mounted thereto and a plate extending from each of the second conductive member, the plates of the second conductive members engaged with one of the guide holes in each of the driving members, and a casing assembly connected to the disk and enclosing the driving members, the first conductive members, the second conductive members, the bearings and the isolation members, the casing assembly having slots defined therethrough and the first conductive members each having a conductive protrusion which is movable extending through the slats.

2. The assembly as claimed in claim 1, wherein the engaging recesses are polygonal engaging recesses and the recess defined in each of the driving member is a polygonal recess.

* * * * *